United States Patent [19]

Hughes

[11] Patent Number: 5,054,229

[45] Date of Patent: Oct. 8, 1991

[54] FISHING ROD HOLDER

[76] Inventor: Thomas M. Hughes, 310 Cardinal Dr., Taylors, S.C. 29687

[21] Appl. No.: 467,255

[22] Filed: Jan. 19, 1990

[51] Int. Cl.$^5$ .............................................. A01K 97/10
[52] U.S. Cl. ....................................................... 43/21.2
[58] Field of Search ................ 43/21.2; 248/511, 519, 248/529, 528, 534

[56] References Cited

U.S. PATENT DOCUMENTS

| | | | |
|---|---|---|---|
| 1,192,112 | 7/1916 | Porter . | |
| 3,031,048 | 4/1962 | Katter | 43/21.2 |
| 3,033,503 | 5/1962 | Wenderski . | |
| 3,063,668 | 11/1962 | Yohe | 43/21.2 |
| 3,246,865 | 4/1966 | Latimer | 43/21.2 |
| 3,290,816 | 12/1966 | Eklof | 43/21.2 |
| 3,327,978 | 6/1967 | Gates . | |
| 3,484,066 | 12/1969 | Aunspaugh | 43/21.2 |
| 3,564,753 | 2/1971 | Fravel . | |
| 3,835,568 | 9/1974 | Whitfield . | |
| 4,261,128 | 4/1981 | Dobbins . | |
| 4,528,768 | 7/1985 | Anderson | 43/21.2 |
| 4,674,222 | 6/1987 | Hughes . | |
| 4,827,654 | 5/1989 | Roberts | 43/21.2 |
| 4,877,165 | 10/1989 | Behrle | 43/21.2 |
| 4,932,152 | 6/1990 | Barlotta | 43/21.2 |

*Primary Examiner*—Kurt Rowan
*Attorney, Agent, or Firm*—Dority & Manning

[57] ABSTRACT

A fishing rod holder for mounting on a boat and being universally applied selectively either to the gunwale of the boat, or to round or square railings mounted on the boat. The holder includes a bracket having two members detachably secured to the railing and is formed with opposing surfaces of circular configuration adapted to encircle round railings having at least two different sizes. The members are also formed with opposing protruding elements having surfaces arranged to contact surfaces adjacent the corners of a square railing having a predetermined cross-section. Two embodiments of a spacer device are disclosed as having thicknesses to supplement the differences in cross-sectional dimensions for square railings of different sizes. One of the members is formed with a plurality of bores arranged for detachably mounting a fishing rod at a plurality of angles relative to the axis of the boat.

6 Claims, 4 Drawing Sheets

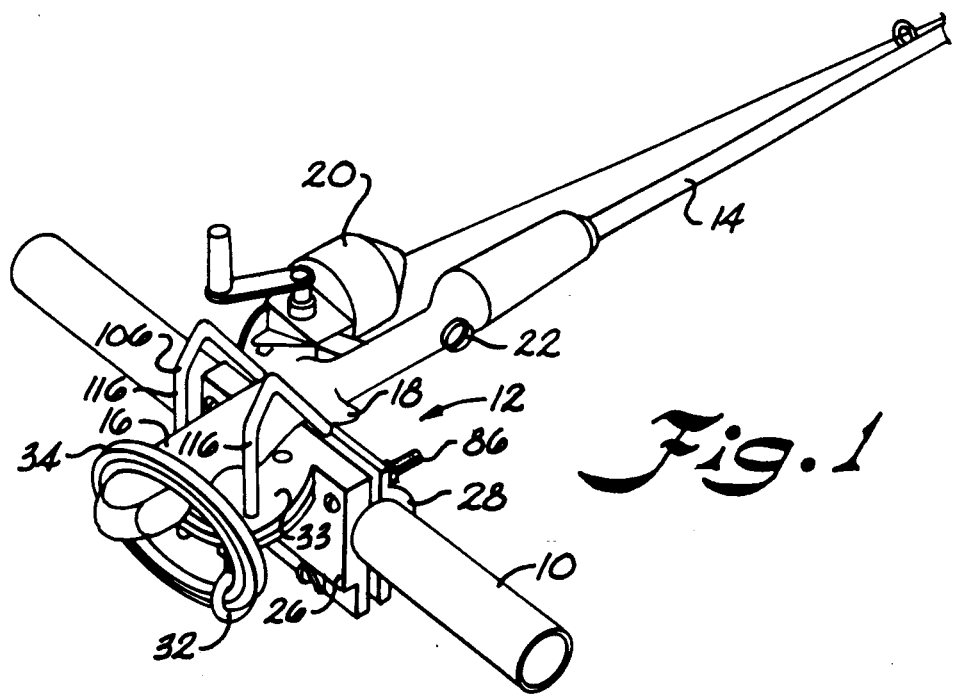
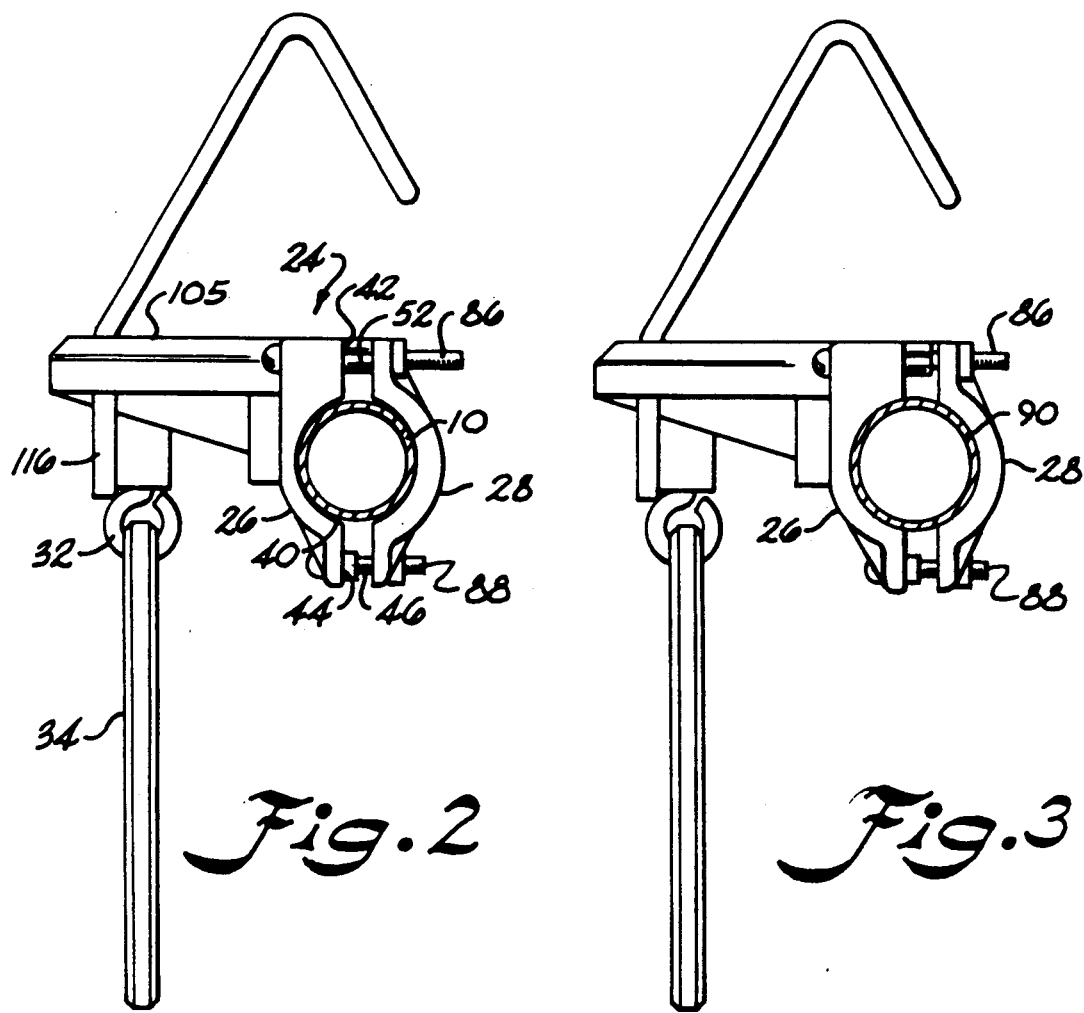
Fig.1
Fig.2  Fig.3

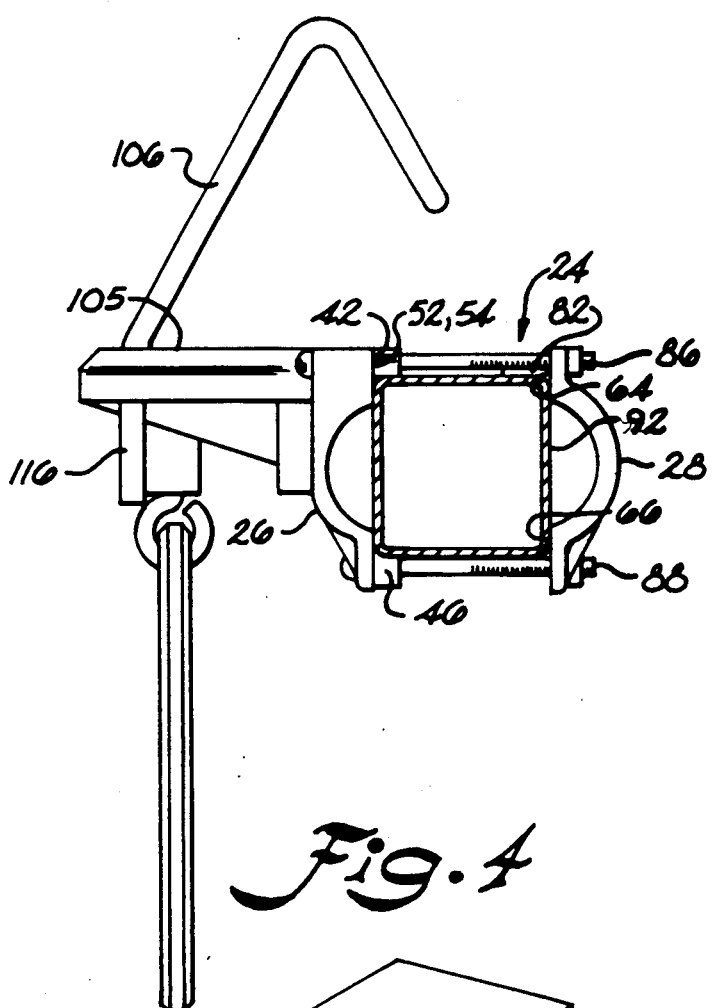
Fig. 4
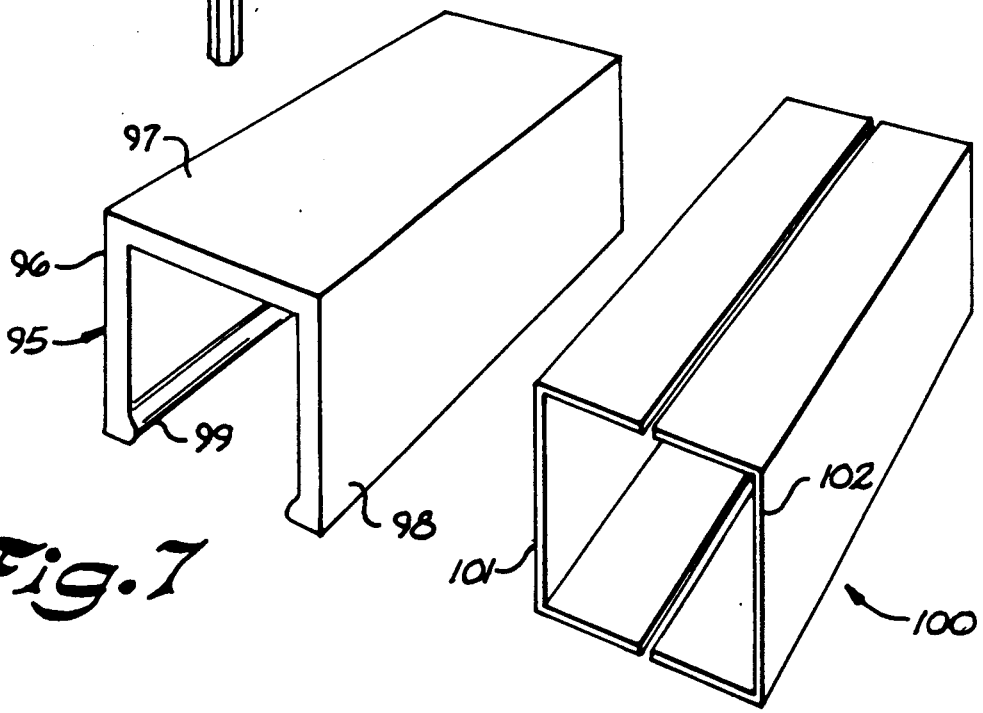
Fig. 7
Fig. 8

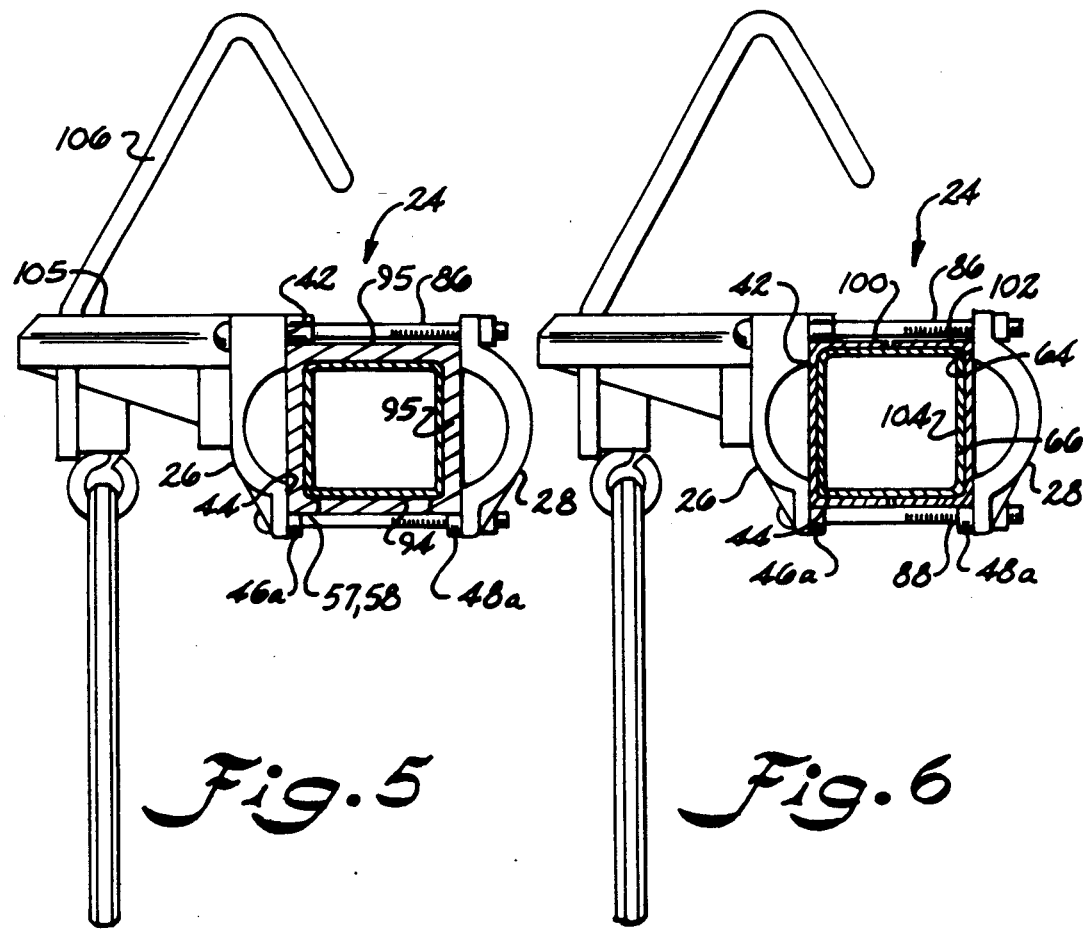
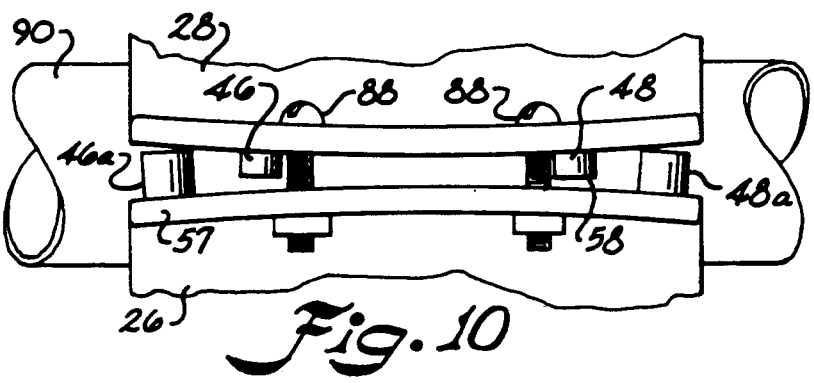

FISHING ROD HOLDER

The present invention relates to fishing rod holders and more particularly to a universal bracket which may detachably support a fishing rod to a railing mounted on the gunwale for a boat. Reference is made to U.S. patent application, Ser. No. 07/307,623, file date Feb. 7, 1989, to the same inventor for which the present invention is a continuation-in-part.

BACKGROUND OF THE INVENTION

There are a number of conventional mounting devices for holding fishing rods to gunwales of boats in use at the present time. These mounting devices are specifically designed and devised for attachment to gunwales but will permit the quick removal of the fishing rod after a hit has been determined so that the fisherman will be free to provide unobstructed handling of the rod for reeling the fish in. However, these conventional mounting devices do not lend themselves to being attached to other structure of the boat.

With the recent advent of pontoon boats and more deluxe boats which are provided with railings over major portions of the boat structure, the conventional mounting brackets for fishing rods are unable to be utilized for detachably holding a fishing rod on these railings. The problem is compounded by the fact that railings on pontoon boats and the more deluxe models of pleasure craft by the provision of railings that are either round and cross-sectioned or square and cross-sectioned. Still further compounding the problem is that these railings come in different sizes, for example, round cross-sectioned railings for the most part are either $\frac{7}{8}''$ or 1" and the square tubing railings have a dimension of 1", $1\frac{1}{8}''$ or $1\frac{1}{4}''$. Therefore, there is great need for a fishing rod holder which not only will accommodate round and square railings but also different sizes of each of these cross-sectional forms.

In the prior art, various patents disclose brackets which detachably support fishing rods to gunwales of fishing vessels. For example, in U.S. Pat. No. 4,674,222 issued to the same inventor as the present invention and to which the present invention is an improvement, the mounting device for the fishing rod holder is devised solely for attachment to a boat gunwale having flat surfaces. In U.S. Pat. No. 3,564,753, a bracket is disclosed as applied to a boat gunwale having a vertical flat surface. The support for a fishing rod bracket disclosed in U.S. Pat. No. 3,327,978 is the fisherman's tackle box. Another basic support for a fishing rod bracket is the seat for a boat as disclosed in U.S. Pat. No. 1,192,112. There is also a category of devices for supporting fishing rod brackets which are mounted in the ground or in ice. Examples of these are disclosed in U.S. Pat. Nos. 3,033,503, 3,835,568 and 4,261,128.

The present invention has been devised in order to obviate the disadvantages and problems discussed above. The rod holder constructed in accordance with the present invention can be mounted on a boat railing having either a round or square cross-section. The rod holder includes a bracket comprising two major members which are applied to both sides of a railing and held together thereon by suitable screws or nuts and bolts. Each of the major members is formed with semi-circular members adapted to encircle a round railing of at least two diameters. The major members are also formed with a set of abutment surfaces which are adapted to accommodate a square tubing of one size. The members are adapted to accommodate spacer elements of different predetermined thicknesses and arranged around the tubing of different sizes, respectively wherein a spacer having one thickness and the dimension of the corresponding tubing equals the one size provided by the members. By virtue of this arrangement, two sizes of tubing of round cross-section and three sizes of tubing of square cross-section are adapted to be accommodated with a minimum of parts [both major members may be very easily molded from plastic material].

Another aspect of the invention is the provision of an arrangement for permitting the fishing rod to assume additional angles relative to the longitudinal axis of the fishing vessel to which it is mounted. One of the major members of the mounting bracket is provided with a plurality of pairs of spaced bores into which a rod restricting member may be inserted. With the rod restricting member inserted in one pair of bores, the fishing rod may extend 90° relative to the longitudinal axis of the fishing vessel. Another set of bores will permit the angularly positioning of the fishing rod 45° relative to the longitudinal axis and facing the rear of the vessel. Still another set of bores will permit 45° angular relationship of the fishing rod relative to the longitudinal axis but facing the bow of the fishing vessel.

Therefore, it is an important object of the present invention to secure a rod holder to a railing of a fishing vessel regardless of whether the railing is of round or square cross-section.

Another important object of the present invention is to secure a rod holder to a railing of a fishing vessel wherein the railing may have different sizes of tubing construction.

Another important object of the present invention is to increase the flexibility to which a fishing rod may be angularly related to the longitudinal axis of a fishing vessel for enhancing the success of a fishing expedition.

The construction designed to carry out the invention will be hereinafter described together with other features thereof.

The invention will be more readily understood from a reading of the following specification and by reference to the accompanying drawing forming a part thereof wherein an example of the invention is shown and wherein:

BRIEF DESCRIPTION OF THE DRAWINGS

FIG. 1 is a perspective view illustrating the rod holder supported on a railing mounted on the gunwale of a boat;

FIG. 2 is a side elevational view illustrating the mounting bracket in accordance with the present invention mounted to a railing having a round cross-section of one size;

FIG. 3 is a side elevational view of the mounting bracket as applied to a round railing having a different size than that shown in FIG. 2;

FIGS. 4, 5 and 6 are side elevational views of the mounting bracket as applied to three different sizes of a square railing;

FIG. 7 is an isometric view of a spacer for a railing;

FIG. 8 is an isometric view of another embodiment of the spacer;

FIG. 10 is a bottom view of a bracket when applied to a round railing; and

DESCRIPTION OF A PREFERRED EMBODIMENT

Figure 11:
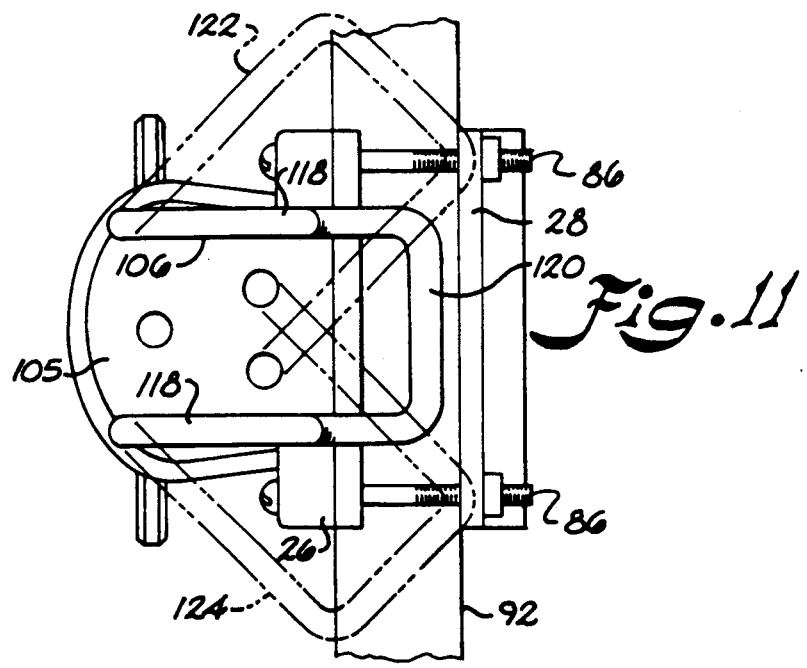
FIG. 11 is a plan view of the mounting bracket showing different arrangements of a rod holder.

Referring to FIG. 1 of the drawings, there is illustrated a railing 10 of round cross-section suitably mounted on the gunwale of a fishing vessel the cross-sectional area of the railing being round and to which the present invention is attached. The rod holder 12 constructed in accordance with the present invention is provided for supporting a conventional fishing rod which includes an elongated rod portion 14 and a handle 16. On this particular rod, there is a finger grip in the form of a trigger 18. A conventional reel 20 is secured to the handle in the conventional manner through the use of screw mechanism 22.

As disclosed in the above referred to U.S. Pat. No. 4,674,222, it is important when trolling or still-fishing that the rod be held at a pre-determined vertical angle. When a fish strikes the rod in order to set the hook it is desirable that the rod be lifted from the rod holder with the tip end of the rod being able to be raised directly upwardly. The rod holder constructed in accordance with the present invention, as will be described below, is a bracket 24 comprising two main members 26, 28 adapted to be mounted on the railing 10 as shown in FIG. 2. An eye-bolt 32 is threadably secured within a threaded bore formed vertically through a horizontally projecting section 33 of the major member 26. A plastic ring 34 is slipped through the eye of the eye-bolt and is utilized to encircle the handle 16 when the fishing rod is not being held by the user.

Figure 9:
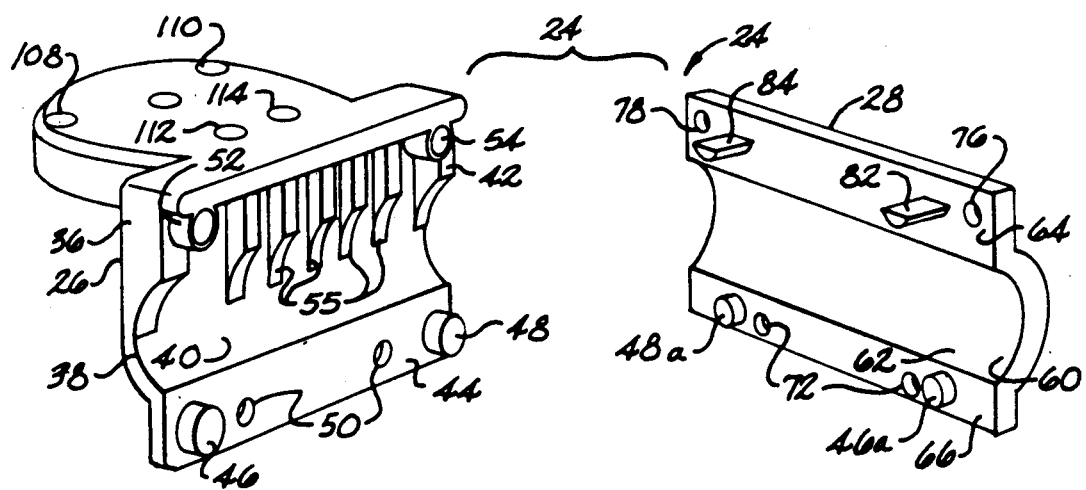
FIG. 9 is an exploded view of the two major portions of the mounting bracket.

Details of the major members 26, 28 of the bracket 24 are illustrated in FIG. 9. The inner major bracket member 26 made from a molded plastic material is formed with a depending section 36 having an outer surface 38 formed partially with a semi-circular configuration 40, an upper flat section 44, and a lower flat surface 42 which is coplanar with the flat section 42.

The flat section 44 is formed with two circular protruding elements 46, 48 and two openings 50 which are arranged to receive mounting bolts, as will be described below. The upper flat section 42 is formed with hollow and protruding round elements 52, 54 which are also arranged to receive mounting screws. At the upper edge of the surface 38 between the elements 52, 54 is a series of protruding elements 55 each of which is formed at the lower ends with circular concave surfaces which are in line with the semi-circular configuration surfaces 40.

As shown in FIG. 9, the outer major bracket member 28 has an exterior surface 60 the middle portion 62 of which is of semi-circular configuration having the same radius of curvature as the semi-circular surface 40. The exterior surface 60 is also formed with an upper flat surface 64 and a lower flat surface 66 extending the entire length of the member 28. A pair of openings 72 are formed in the lower edge of the member 28 from the surface 66. The openings 72 correspond to the openings 50 in the member 26 for receiving mounting bolts, as will be described below. Two circular protruding elements 46a and 48a are carried on the flat surface 66 being spaced as to be inwardly of the elements 46, 48 when the members 26 and 28 are joined, as will be discussed below.

The upper edge of the member 28 and through the surface 64 are a pair of openings 76, 78 the ends thereof which correspond to the openings 52, 54 respectively in the member 26. Spaced inwardly from the opening 76, 78 are two elongated protruding elements 82, 84 which have lower surfaces in alignment with the lower surfaces of the round elements 52, 54, respectively. Preferably the protrusions 82, 84 have a semi-circular cross-section wherein the flat portion of the protrusions face upwardly so as to clear structure in the member 26 when the members 26, 28 are assembled.

When the members 26, 28 are mounted on the railing 10 as shown in FIG. 2, the semi-circular surfaces 40 and 62 are oriented in opposed relationship to encircle the railing. Preferably the radius of curvature of the surfaces 40, 62 is slightly larger than the radius of curvature of the tubing 10, which for illustrative purposes has an exterior diameter of ⅞". When so opposed and mounted on the railing, the openings formed in the hollow elements 52, 54 align with the openings 76, 78 respectively in the member 28 for receiving bolts 86 therein to secure the upper portion of the major bracket members. Similarly the openings 50 in the member 26 will be aligned with the openings 72 in the member 28 for receiving bolts 88 therein for securing the lower portions of the major bracket members. The bolts 86, 88 may be turned to effect complete clamping of the members 26, 28 upon the railing 10 without any interfering structure therebetween.

In the embodiment of FIG. 3 wherein a railing 90 having an exterior diameter slightly larger than the railing 10, say, for example, having an exterior diameter of 1" or maybe even larger, the members 26, 28 may be clamped thereto by the use of the bolts 86, 88. In this embodiment, the railing 90 has a slightly larger diameter than the radius of curvature of the surfaces 40, 62, and therefore, the railing is not completely surrounded along the entire surfaces 40, 62. As shown in FIG. 9, the juncture points for the upper flat surface 42 and the circular surface 40 will contact the tubing 90 as will the juncture of the surface 38 between the lower flat surface 44 and the circular surface 40 with respect to the member 26. Similarly, the junction point on the surface 60 between the circular surface 62 and lower flat surface 66 and the upper surface 64 will contact the outer surface of the railing 90 to provide complete and secure mounting of the bracket 24 on the railing 90. Additional turning of the lower bolts 88, as shown in FIG. 10, will produce slight inward flexing of the lower edges of the members 26, 28 thereby producing a slight wedging action upon the railing 90.

In the embodiment of FIG. 4, the bracket 24 is applied to a railing 92 having a square cross-section and, for illustrative purposes, is a 1¼" square tubing. The corners of the railing 92 are rounded, as in the conventional square railings of today's pleasure vessels and those elements of the bracket contacting and holding the railing have dimensions to accommodate the same. The upper corners of the railing 92 are held against the surface 42 and against and below the protruding round elements 52, 54 with respect to the bracket member 26, and against the surface 64, and against and below the elements 80, 82 with respect to the member 28. The lower corners of the railing 92 are held against the surfaces 44 and 66 of the members 26, 28, respectively and against the lower bolts 88. This arrangement locks the square railing 92 against vertical or horizontal movement and with the screws 86, 88 sufficiently tightened against sliding movement along the railing.

In the embodiment of FIG. 5, the bracket 24 is shown in clamping relationship to a railing 94 having a smaller cross-section than the railing 92, say, for example, 1". In this embodiment, a three-sided member 95 made from plastic material and extending the length of the bracket 24 is slipped over the railing. The member 95, comprising three side walls 96, 97 and 98, is open at its lower side and is formed with inwardly extending projections 99 on the lower edges of the walls 96, 98 which serve to maintain the member 95 upon the railing 92. To mount the spacer 95, the user merely flexes the walls 96, 98 outwardly a sufficient distance to enable the projections 99 to clear the dimension of the railing.

The thicknesses of the side walls 96, 97, 98 are ⅛" with the inner dimension from wall to wall being 1" so that when the spacer is mounted on the railing 92, the total dimension is equal to 1¼", the same outer dimension of the railing 92 in the embodiment of FIG. 4. With this arrangement, as shown in FIG. 5, the spacer 95 with the railing 94 therein is held against the surfaces 42, 44 with respect to the bracket member 26 and the surfaces 64, 66 with respect to the member 28, and between the elements 52, 54 and the elements 46, 48 of the member 26, and the elements 82, 84 and the elements 46a, 48a of the member 28, as shown in FIGS. 5 and 6. The length of the walls 96, 98 are 1¼" and, therefore, will be held against the screws 88.

In the event the railing 94 has an outer dimension of 1⅛" instead of 1", the thickness of the spacer walls 96, 97 and 98 may be chosen as 1/16" thereby providing a total dimension of 1¼". In this arrangement, the spacer and railing would be clamped in the same manner and with the same structure as the embodiment of FIG. 5.

In the embodiment of FIGS. 6 and 8, a preferred form of spacer is illustrated. The spacer member 100 is shown as comprising two U-shaped elements 101, 102 adapted to be slipped upon a railing 104 from the sides thereof. With the spacer 100 applied upon the railing and the bracket clamped thereon, and assuming the railing is a 1⅛" tubing and the thickness of the walls of the elements 101, 102 is 1/16", the outer dimension of the combined spacer/railing is 1¼" as was the case for the embodiment of FIGS. 4 and 5. Therefore, the spacer and railing of FIG. 6 will be clamped in the same manner as is the spacer and railing of FIGS. 4 and 5.

From the foregoing description, it will be understood that the structural arrangement and sizes of the parts for the bracket members 26, 28 are such that the square railings having the largest cross-section, generally utilized in pleasure craft, are adapted to be clamped without the aid of spacers. For railings of less cross-section, full, railing-encompassing spacers having wall thickness of predetermined size which, when added to the railing cross-section, equal the cross-section dimension of the largest railing, may be utilized to supplement the difference in dimension. It will also be appreciated that the multi-size clamping arrangement for square railings described in the foregoing is particularly devised for railings which have rounded corners having a radius of curvature ⅛" and more.

The bracket 24 may also be directly applied to a gunwale of a fishing vessel which is not provided by a railing. In this arrangement, while not illustrated, the outer major bracket member 28 may be dispensed with for this utilization, and the openings 50, and the openings provided in the round elements 52, 54 may be utilized to support the major member 26 directly on the gunwale by the use of screws rather than bolts. In this arrangement, the round elements 46, 48 and the hollow round elements 52, 54 would be directly applied to the surface of a gunwale and screws utilized to support the same on the gunwale.

The bracket 24 is also formed with the section 33 having an upper surface 105 lying in a plane 90° to the plane of the surfaces 42, 44 on the major member 26. The extension 33 is formed with five vertically extending spaced bores which are arranged to permit the orientation of a fishing rod holding or restricting member 106 into three different selected positions upon the bracket 24. Two of the openings indicated at 108, 110 are arranged to support the restricting member 106 at one angularly related position relative to the railing 10. A second pair of openings 112, 114 is formed in the surface 105 close together and inwardly toward the member 36.

The rod holding member 106 is constructed in one integral piece from a metal rod. It includes a pair of vertically extending laterally spaced legs 116 which fit down into the laterally spaced bores 108, 116 to orient the rod restricting member 106 as shown in full lines in FIG. 11 whereby the fishing rod will be held in position at an angle 90° to the railings 10, 90, 92, 94 or 104. Outwardly projecting arms 118 are integral with the upper ends of the laterally spaced legs and prevent rotation of the handle 16 within the rod restricting member 106. A U-shaped element 120 is integral with and joins the outer ends of the outwardly projecting arms.

In another orientation of the rod restricting member 106, as shown in dotted lines 122 in FIG. 11, the legs 116 are inserted in the openings 110, 112 which are arranged so that the member 106 is 45° relative to the axis of the railing to which it is attached and angled toward the stern of the fishing vessel. The rod restricting member 106 may be removed and the legs 116 inserted in the openings 108, 114 to orient the same, as shown in dotted lines 124, thereby positioning the fishing rod at an angle 45° to the railing upon which it is attached but directed toward the bow of the boat.

From the foregoing it will be appreciated that the present invention provides a more universal mounting means for a fishing rod by an arrangement wherein a mounting bracket may be attached directly to a gunwale, to a round railing on the gunwale having two different diameters therefor, or mountable upon a square railing having three dimensions thereto. It will also be appreciated that the clamping structure for mounting on railings having square cross-section has been devised to accommodate the rounded corners of the railings as well as those railings having square corners.

It will be understood that while the forms of the invention herein shown and described constitute a preferred embodiment of the invention, it is not intended to illustrate all possible forms of the invention. It will also be understood that the words used are words of description rather than of limitation and that various changes may be made without departing from the spirit and scope of the invention herein disclosed.

What is claimed is:

1. A fishing rod holder for mounting on a boat supporting a fishing rod in a fishing position relative to the longitudinal axis thereof, the rod holder including a handle and a reel carried on an intermediate portion of the handle, comprising:
- a bracket having a plurality of pairs of vertically extending spaced bores formed therein,
- a one piece restricting member readily insertable into and removable from said spaced bores selectively, said restricting member including:
  - (i) a pair of vertically extending laterally spaced legs,
  - (ii) outwardly projecting arms integral with the upper ends of said laterally space legs for engaging the handle below the reel
  - (iii) a U-shaped member joining the outer ends of said outwardly projecting arms with a base portion positioned below the handle when the rod is mounted on the rod holder,
- said bores being arranged to present fixed aligned pairs, each pair of which is adapted to receive said legs of said restricting member and to position the fishing rod at different predetermined angles selectively relative to the longitudinal axis of the boat.

2. The fishing rod holder as defined in claim 1 wherein one pair of said aligned bores is adapted to receive said legs to position the fishing rod at an angle of approximately 45° to said axis.

3. The fishing rod holder as defined in claim 1 wherein said pairs of bores are adapted to position the fishing rod at an angle approximately perpendicular to said axis, and at another angle directed toward the stern of the boat.

4. A fishing rod holder for mounting on a railing of a boat for supporting a fishing rod in a fishing position wherein the railing has a round or square cross-section of different sizes, the rod including a handle and a reel carried on an intermediate portion of the handle, comprising:
- a bracket arranged to support the rod holder and having two members adapted to be joined together when applied on and secured to the railing, said bracket having a plurality of spaced bores formed therein,
- said members being formed with opposed surfaces of circular configuration having a radius of curvature for approximately one of the sizes of a round railing for engaging portions of the round railing,
- said members being formed with opposed upper and lower surfaces for engaging one side of each of the corners of a square railing having a predetermined size,
- a spacer device adapted for mounting on a square railing having a size different than said predetermined size, said spacer being adapted to engage said upper and lower surfaces when in securing position, and
- a one piece restricting member readily insertable into and removable from said spaced bores selectively, said restricting member including:
  - (i) a pair of vertically extending laterally spaced legs,
  - (ii) outwardly projecting arms integral with the upper ends of said laterally spaced legs for engaging the handle below the reel
  - (iii) a U-shaped member joining the outer ends of said outwardly projecting arms with a base portion positioned below the handle when the rod is mounted on the rod holder,
- said bores being arranged to present fixed aligned pairs, each pair of which is adapted to receive said legs of said restricting member and to position the fishing rod at different predetermined angles selectively relative to the longitudinal axis of the boat.

5. A fishing rod holder for mounting on a railing of a boat for supporting a fishing rod in a fishing position wherein the railing has a round or square cross-section of different sizes, the rod including a handle and a reel carried on an intermediate portion of the handle, comprising:
- a bracket arranged to support the rod holder and having two members adapted to be joined together when applied on and secured to the railing,
- said members being formed with opposed surfaces of circular configuration having a radius of curvature for approximately one of the sizes of a round railing for engaging portions of the round railing,
- said members being formed with opposed upper and lower surfaces for engaging one side of each of the corners of a square railing having a predetermined size, and
- a spacer device adapted for mounting on a square railing having a size different than said predetermined size, said spacer device being adapted to engage said upper and lower surfaces when in securing position and comprising a unitary element having three perpendicular walls and an open end adapted to be slipped over the railing.

6. A fishing rod holder for mounting on a railing of a boat for supporting a fishing rod in a fishing position wherein the railing has a round or square cross-section of different sizes, the rod including a handle and a reel carried on an intermediate portion of the handle, comprising:
- a bracket arranged to support the rod holder and having two members adapted to be joined together when applied on and secured to the railing,
- said members being formed with opposed surfaces of circular configuration having a radius of curvature for approximately one of the sizes of a round railing for engaging portions of the round railing,
- said members being formed with opposed upper and lower surfaces for engaging one side of each of the corners of a square railing having a predetermined size, and
- a spacer device adapted for mounting on a square railing having a size different than said predetermined size, said spacer device being adapted to engage said upper and lower surfaces when in securing position and comprising two U-shaped elements, each being adapted to be slipped over a side of the railing.

* * * * *